United States Patent [19]
Kim

[11] Patent Number: 6,118,653
[45] Date of Patent: Sep. 12, 2000

[54] CAMERA MOUNTING MECHANISM FOR SUPPORTING AN ELECTRONIC CAMERA ON A PORTABLE COMPUTER

[75] Inventor: Jung-Ho Kim, Seoul, Rep. of Korea

[73] Assignee: SamSung Electronics Co., Ltd., Suwon, Rep. of Korea

[21] Appl. No.: 09/089,944

[22] Filed: Jun. 3, 1998

[30] Foreign Application Priority Data

Jun. 3, 1997 [KR] Rep. of Korea ................. 97-22971

[51] Int. Cl.[7] ............... H05K 5/00; A47B 81/00; G06F 15/16
[52] U.S. Cl. .................. 361/683; 361/681; 361/682; 361/683; 361/686; 312/223.1; 364/705.01
[58] Field of Search .................. 361/683, 681, 361/686, 682; 312/223.1; 364/705.01

[56] References Cited

U.S. PATENT DOCUMENTS

| | | |
|---|---|---|
| 4,198,157 | 4/1980 | Johnson . |
| 5,226,540 | 7/1993 | Bradbury . |
| 5,442,512 | 8/1995 | Bradbury . |
| 5,475,441 | 12/1995 | Parulski et al. . |
| 5,479,206 | 12/1995 | Ueno et al. . |
| 5,488,558 | 1/1996 | Ohki . |
| 5,497,296 | 3/1996 | Satou et al. ............. 361/681 |
| 5,506,617 | 4/1996 | Parulski et al. . |
| 5,576,757 | 11/1996 | Roberts et al. . |
| 5,617,312 | 4/1997 | Iura et al. . |
| 5,634,144 | 5/1997 | Mauro et al. . |
| 5,652,927 | 7/1997 | McIntyre . |
| 5,666,159 | 9/1997 | Parulski et al. . |
| 5,708,853 | 1/1998 | Sanemitsu . |
| 5,719,799 | 2/1998 | Isashi . |
| 5,768,163 | 4/1996 | Smith, II ............. 364/705.01 |
| 5,801,919 | 9/1998 | Griencewic ............. 361/683 |
| 5,880,928 | 6/1997 | Ma ............. 361/683 |

Primary Examiner—Leo P. Picard
Assistant Examiner—Tung Minh Bui
Attorney, Agent, or Firm—Robert E. Bushnell, Esq.

[57] ABSTRACT

A portable computer, provided with an apparatus capable of easily mounting a small size camera to a display panel hinged to the main body of a portable computer, is disclosed. The portable computer has a camera designed for inputting picture information into the portable computer, a camera receiving body and a camera receiving room. The camera receiving body is hinged to the upper portion of the display panel at a position opposite to the hinge portion of the display panel in order to fold the main body and the display panel. The camera receiving room is defined in the camera receiving body in such a manner that a lens of the camera is exposed to the exterior of the portable computer through a hole formed on the camera receiving body at a desired position.

20 Claims, 11 Drawing Sheets

CAMERA MOUNTING MECHANISM FOR SUPPORTING AN ELECTRONIC CAMERA ON A PORTABLE COMPUTER

CLAIM FOR PRIORITY

This application makes reference to, incorporates the same herein, and claims all benefits accruing under 35 U.S.C. §119 from an application for APPARATUS FOR MOUNTING CAMERA AND PORTABLE COMPUTER PROVIDED WITH THE SAME earlier filed in the Korean Industrial Property Office on the $3^{rd}$ of June 1997, and there duly assigned Ser. No. 22971/1997, a copy of which application is annexed hereto.

BACKGROUND OF THE INVENTION

1. Technical Field

The present invention relates to a camera mounting mechanism for supporting an electronic camera integrated in a computer system and, more particularly, to a camera mounting mechanism for efficiently supporting a small size electronic camera on a display panel hinged to the main body of a portable computer while concomitantly serving as a locking device to lock the display panel in a closed position when the display panel is folded onto the main body of the portable computer.

2. Related Art

Electronic cameras, especially digital-type electronic cameras in which digital image data is obtained, have recently become the focus of much attention because their applications can be used in tandem with a computer system as demonstrated, for example, in U.S. Pat. No. 5,479,206 for Image System, Electronic Camera, Computer System For Controlling Said Electronic Camera, And Methods Of Controlling Same issued to Ueno et al., U.S. Pat. No. 5,506,617 for Electronic Camera Incorporating A Computer-Compatible Bus Interface issued to Parulski et al., U.S. Pat. No. 5,576,757 for Electronic Still Video Camera With Direct Personal Computer (PC) Compatible Digital Format Output issued to Roberts et al., U.S. Pat. No. 5,617,312 for Computer System That Enters Control Information By Means Of Video Camera issued to Iura et al., U.S. Pat. No. 5,634,144 for Light Beam Communication Method And System For Linking A Camera And A Computer issued to Mauro et al., U.S. Pat. No. 5,652,927 for Transmitting Information Between A Computer And An Auto Focus Camera issued to McIntyre, and U.S. Pat. No. 5,666,159 for Electronic Camera System With Programmable Transmission Capability issued to Parulski et al. Generally, image data representing an image of the subject photographed by the electronic camera is first transmitted to the computer system for recording and, if necessary, editing on a recording medium such as an optical disk or magnetic disk provided in the computer system. A typical electronic camera is connected to the computer system, usually a desktop personal computer, by way of either a cable as disclosed in U.S. Pat. No. 5.479,206 issued to Ueno et al., U.S. Pat. No. 5,506,617 issued to Parulski et al., and U.S. Pat. No. 5,617,312, or wireless transmission as disclosed in U.S. Pat. No. 5,634, 144 issued to Mauro et al., U.S. Pat. No. 5,652,927 issued to McIntyre, and U.S. Pat. No. 5,666,159 issued to Parulski et al.

For portable computers such as laptop computers, notebook computers and palmtop computer which are different from desktop personal computers, the electronic camera may also be connected to the portable computer by way of a cable as disclosed, for example, in U.S. Pat. No. 5,547,441 for Electronic Camera With Memory Card Interface To A Computer issued to Parulski et al., or a detachable IC card as disclosed, for example, in U.S. Pat. No. 5,488,558 for Handy Computer With Built-In Digital Camera And Spot State Recording Method Using The Same issued to Ohki, and U.S. Pat. No. 5,708,853 for IC Card Having Camera, Microphone, And Modem For Use In Information Processors issued to Sanemitsu. In some instances, the electronic camera may be integrally mounted onto the portable computer such as disclosed in U.S. Pat. No. 5,719,799 for Portable Information Processing Apparatus issued to Isashi.

When the electronic camera is typically mounted on the portable computer, however, I have observed that there are several problems related thereto. First, the camera has to be positioned in front of the user for convenience. Second, the camera has to be mounted on a display panel in such a way that it will not bump against the main body of the portable computer after the display panel is folded. Therefore, it has been difficult to effectively mount the electronic camera onto the portable computer that is compact and light weight. In addition, a locking mechanism is also required to secure the electronic camera mounted to the display panel, which increases the size and weight of the portable computer and occupies the valuable space on the display panel. Lastly, the portable computer has to be especially designed to accommodate mounting of the electronic camera and the locking mechanism.

SUMMARY OF THE INVENTION

Accordingly, it is therefore an object of the present invention to provide a novel camera mounting mechanism for conveniently supporting an electronic camera on a display panel of a portable computer.

It is also an object to provide a camera mounting mechanism that is simple for construction, easy for use and convenient for supporting an integrated electronic camera on a display panel of a portable computer.

It is further an object to provide a camera mounting mechanism for conveniently mounting an electronic camera on a display panel of a portable computer while concomitantly serving as a locking device for locking the display panel in a closed position when the display panel is folded onto the main body of the portable computer.

It is another object to provide a camera mounting mechanism that is compact and light weight for supporting an integrated electronic camera while effectively maximizing usable space defined on a display panel of a portable computer and eliminating requirement of a separate locking device.

These and other objects of the present invention can be achieved by a camera mounting mechanism for mounting an electronic camera onto a display unit of a portable computer, which has an electronic camera; a camera receiving body pivotable on the display unit of the portable computer, for supporting said electronic camera operatively connected to internal circuitry of the portable computer; and a camera receiving room defined in the camera receiving body in such a manner that a lens of said electronic camera is exposed to the exterior of the portable computer through an aperture formed on the camera receiving body at a desired position.

In accordance with one aspect of the present invention, a portable computer has a base panel having a latch groove of a predetermined width; a display panel pivotably mounted on the base panel for movement between a closed position when the display panel pivots to cover the base panel, and an open position when the display panel pivots to open the base panel; and a camera mounting mechanism pivotably mounted on a top surface of the display panel, for supporting an electronic camera operatively connected to internal circuitry of the computer system via the display panel, and for serving as a locking device for locking the display panel when the display panel is folded onto the base panel in the closed position. The camera mounting mechanism has a main body having a latch member mounting room for flexibly supporting a latch member for latching onto the latch groove of the base panel to lock the display panel while the display panel is in the closed position. The latch member includes a latch body adjustably positioned in the latch member mounting room; a latch hook formed on a front wall of the latch body for hooking onto the latch groove of the base panel; a guide protrusion formed on a bottom surface of the latch body for insertion into a guide hole of a partition; and an elastic member mounted between the partition and the guide protrusion of the latch body, for permitting the latch hook to be elastically engaged with and released from the latch groove of the base panel.

In accordance with another embodiment of the present invention, a portable computer has a base panel having a first seat in a stair shape for accomodating a camera mounting mechanism and a latch groove of a predetermined width formed at the bottom of the first seat; a display panel having a second seat in a stair shape on a top surface, and pivotably mounted on the base panel for movement between a closed position when the display panel pivots to cover the base panel, and an open position when the display panel pivots to open the base panel; and a camera mounting mechanism pivotably mounted on opposite walls of the second seat of the display panel, for supporting an electronic camera operatively connected to internal circuitry of the base panel via the display panel, and for serving as a locking device for locking the display panel when the display panel is folded onto the base panel in the closed position. The camera mounting mechanism has a main body having a latch member mounting room for flexibly supporting a latch member for latching onto the latch groove of the base panel to lock the display panel while the display panel is in the closed position.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
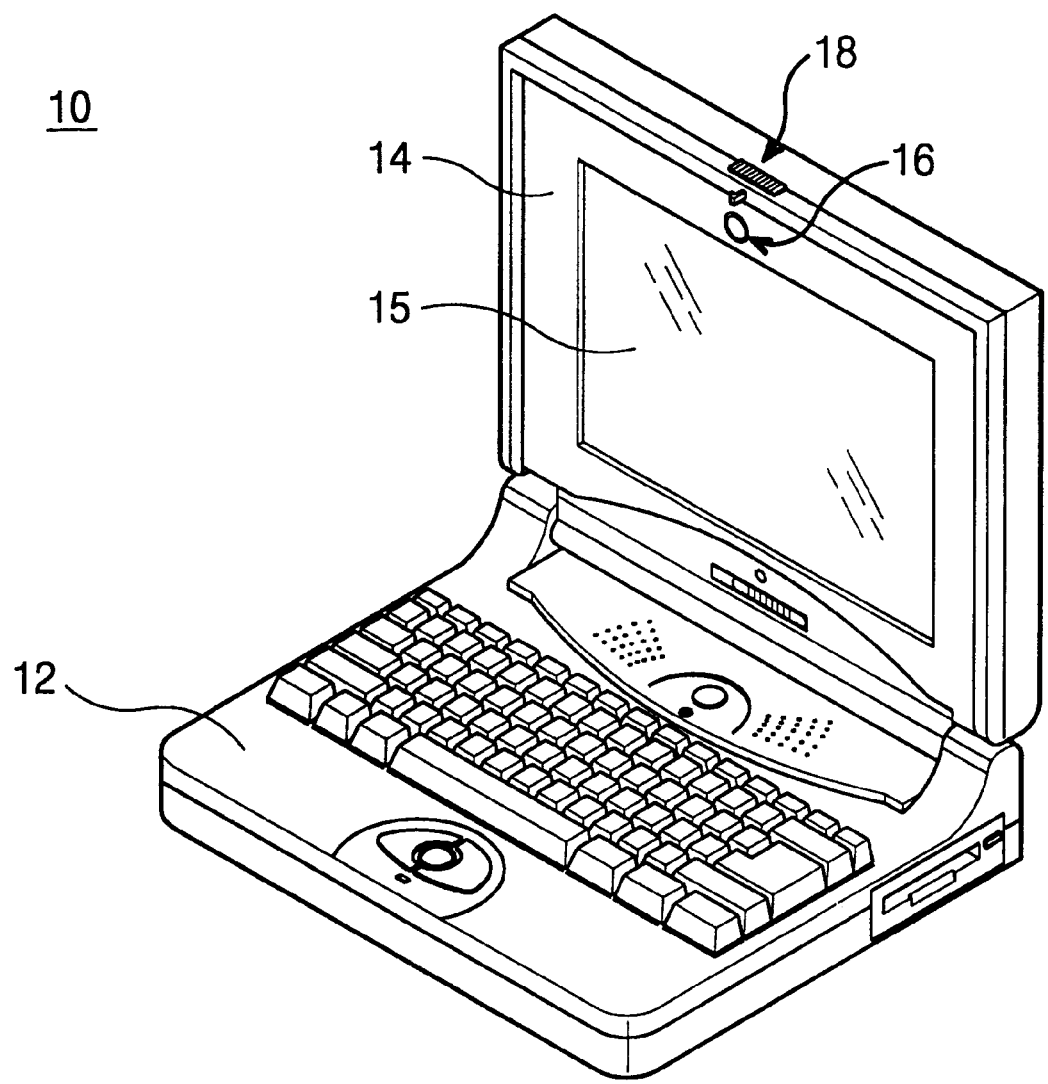
FIG. 1 is a perspective view of a typical portable computer with a locking device.

Referring now to the drawings and particularly to FIG. 1, which illustrates a typical portable computer with an integrated electronic camera. The portable computer 10 has a main body 12 and a display panel 14 hinged to the main body 12. Electronic devices such as a main board (not shown) are mounted in the main body 12, while a display unit 15 such as a liquid crystal display (LCD) is mounted in the display panel 14. In addition, an electronic camera 16, which is generally compact, is mounted to the upper portion of the display panel 14 at a central position for picture communication through the camera. The display panel 14 is provided with a locking device 18 so as to prevent the panel 14 from being opened after folding.

As I have described, the portable computer that has a typical electronic camera mounted thereto has several problems. First, the camera has to be positioned in front of the user for convenience. Second, the camera has to be mounted on a display panel in such a way that it will not bump against the main body of the portable computer after the display panel is folded. Therefore, it has been difficult to effectively mount the electronic camera onto the portable computer that is compact and light weight. In addition, a locking mechanism is also required to secure the electronic camera mounted to the display panel, which increases the size and weight of the portable computer and occupies the valuable space on the display panel. Lastly, the portable computer has to be especially designed to accommodate mounting of the electronic camera and the locking mechanism.

Figure 2:
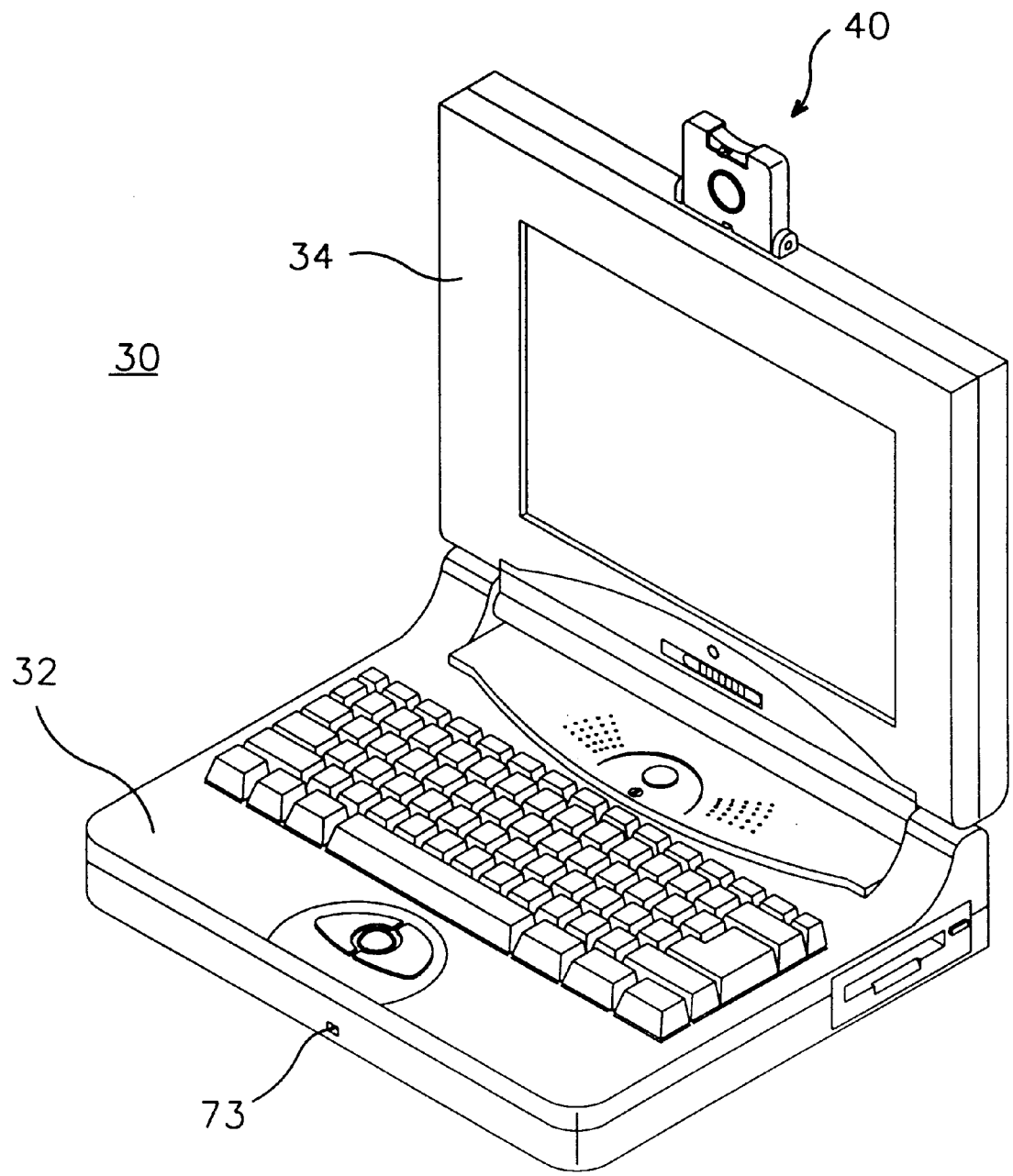
FIG. 2 is a perspective view of a portable computer with a camera mounting mechanism constructed according to a first embodiment of the present invention.

Turning now to FIG. 2 which illustrates a portable computer having a camera mounting mechanism constructed to support an electronic camera while serving as a locking device in accordance with a first embodiment of the present invention. As shown in FIG. 2, the portable computer 30 has a main body 32, a display panel 34 hinged to one edge of the main body 32 and a camera mounting mechanism 40 hinged to the display panel 34 for supporting an electronic camera mounted onto the display panel 34 of the portable computer. The camera mounting mechanism 40 is hinged to the top portion of the display panel 34 at a position opposite to the main body 32. Thus, when the display panel 34 is folded onto the main body 32 of the portable computer in a closed position, the top portion of the camera mounting mechanism 40 is pivotable about a hinge axis to latch onto a latch groove 73 of the main body 32 for locking the display panel 34 in the closed position.

Figure 3:
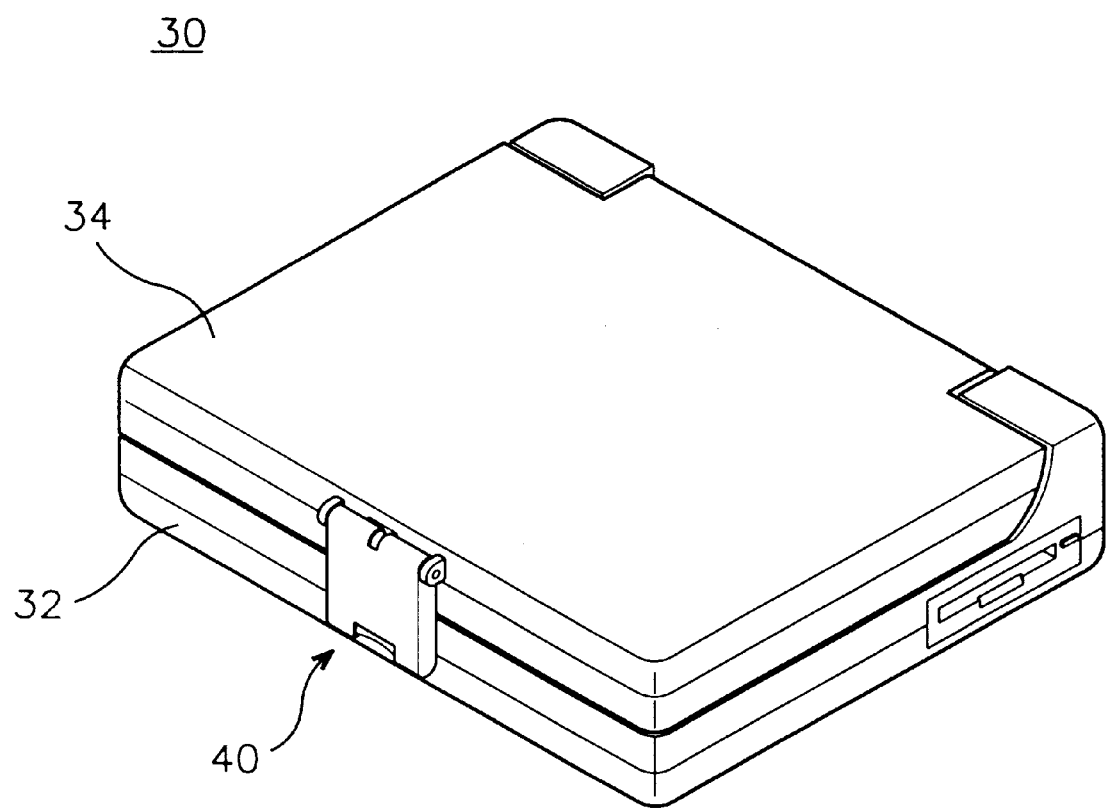
FIG. 3 is a perspective view of the portable computer of FIG. 2, when a display panel is folded and a camera mounting mechanism is latched onto a main body of the portable computer.
Figure 4:
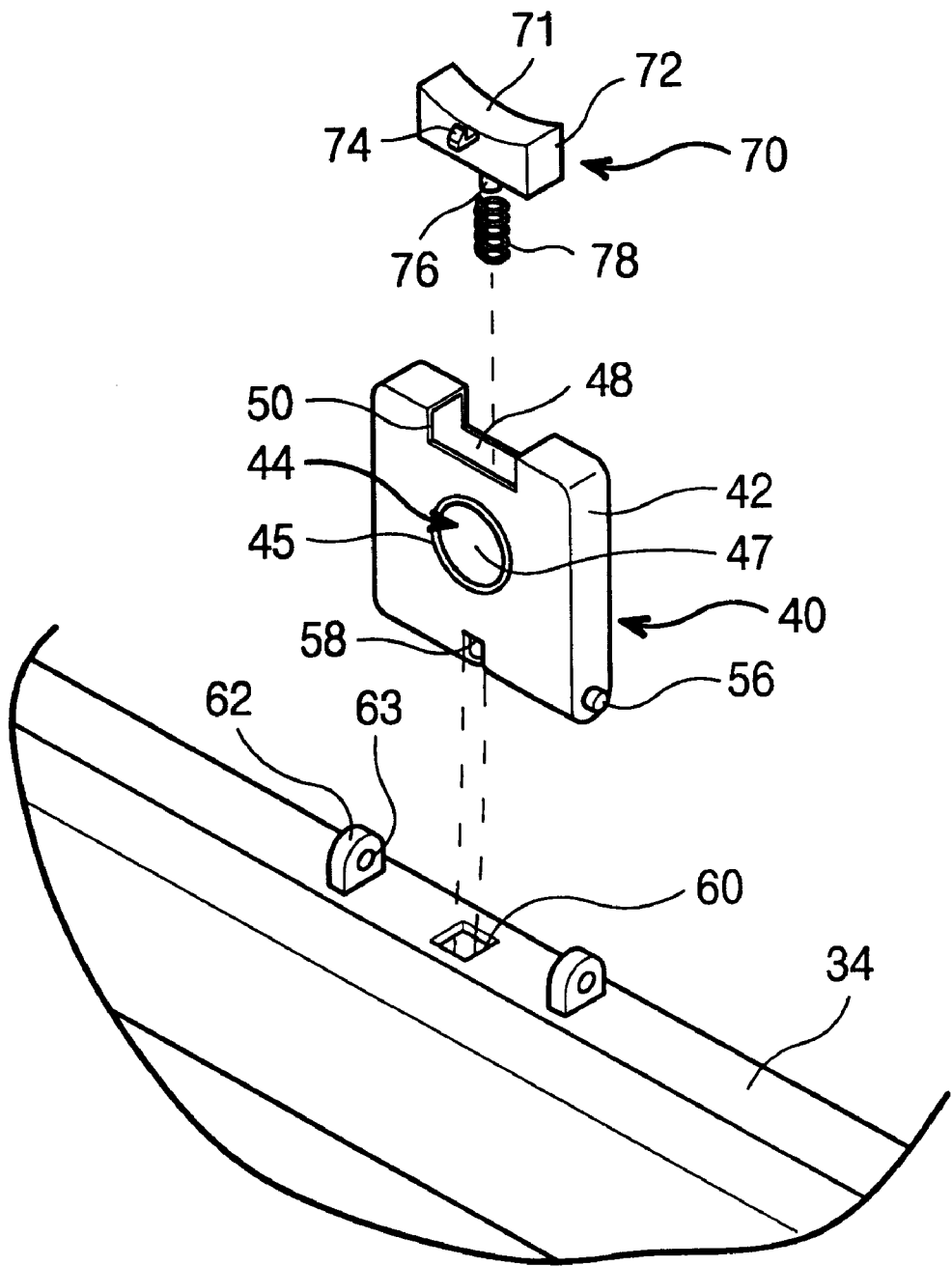
FIG. 4 is an exploded perspective view of the camera mounting mechanism of FIG. 2.
Figure 5:
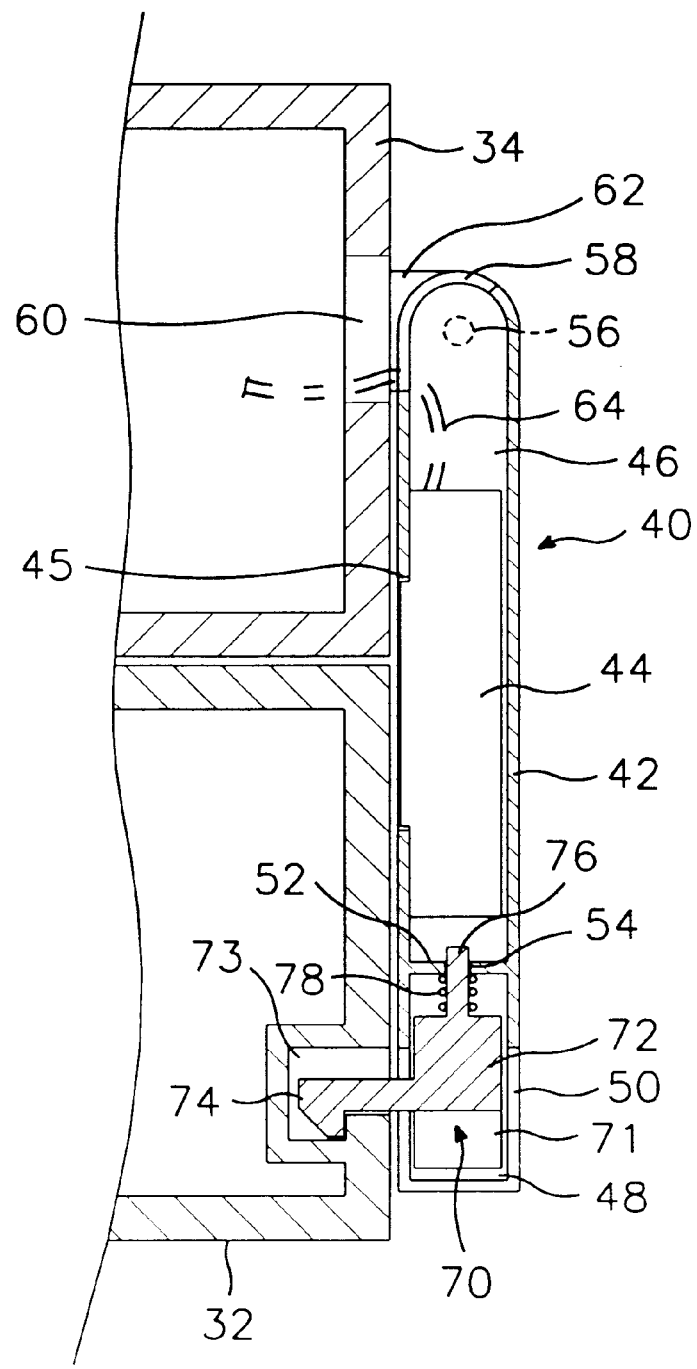
FIG. 5 is a sectional side view of the camera mounting mechanism of FIG. 3, when latched onto the main body of the portable computer.
Figure 6:
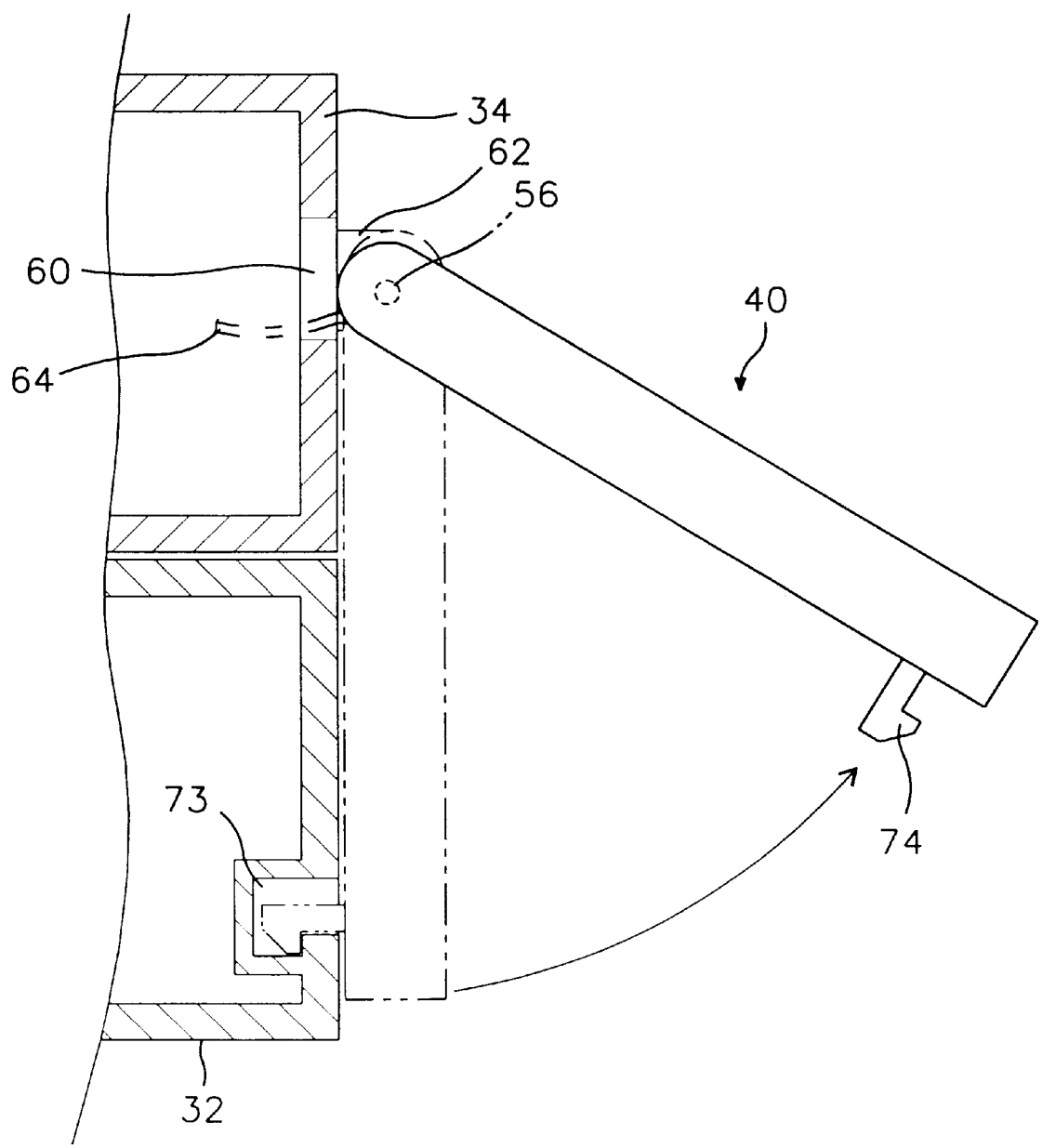
FIG. 6 is a sectional side view of the camera mounting mechanism of FIG. 2, when released from the main body of the portable computer.

FIG. 3 provides a perspective view of the portable computer having a camera mounting mechanism 40 as shown in FIG. 2, when the display panel 34 is folded and the camera mounting mechanism 40 is latched onto the main body 40 of the portable computer. FIG. 4 provides an exploded perspective view of the camera mounting mechanism of the portable computer as shown in FIG. 2. FIG. 5 is a sectional side view of the camera mounting mechanism of FIG. 3, when latched onto the main body of the portable computer. Likewise, FIG. 6 is a sectional side view of the camera mounting mechanism of FIG. 2, when released from the main body of the portable computer.

As shown in FIG. 4, the camera mounting mechanism 40 has a camera receiving body 42 and a latch member 70. The camera receiving body 42 has two hinge pins 56 at opposite side walls in order to individually fit into corresponding holes 63 of hinge protrusions 62, which are formed on the top surface of the display panel 34. The camera receiving body 42 has an opening 45 at a center portion and a camera receiving room 46 for accommodating the lens 47 of a camera 44 which is exposed to the exterior of the mounting mechanism 40 through the opening 45.

The camera 44, which is positioned in the camera receiving room 46 of the mounting mechanism 40, is electrically connected to the internal electronic circuitry of a main board (not shown) in the main body 32 by cable line 64 as shown in FIG. 5. In order to connect cable line 64 to the main body 32 of the portable computer 30, a slot (or receptacle) 60 is provided between the hinge protrusions 62 on the top surface of the display panel 34, while another slot 58 is formed on the hinge portion of the camera receiving body 42 at a position corresponding to the slot 60 provided on the top surface of the display panel 34. Thus, the camera 44 is electrically connected to the main board by the cable line 64 passing through the two slots 58 and 60. As a result, the control signal from the main board is easily transmitted to the camera 44 by way of cable line 64, while picture information through the camera 44 is also transmitted to the main board.

The display panel 34 is connected to the main body 32, via at least one or two hinges. The display panel 34 rotates between a closed position when the display panel 34 is folded onto the main body 32 and an open position when the display panel 34 is released from the main body 32. When the display panel 34 is folded onto the main body 32 of the portable computer in a closed position, it is necessary to use a locking device to lock the folded display panel 34 onto the main body 32 and prevent the folded display panel 34 from being opened from the main body 32. As a result, the camera mounting mechanism 40 of the preferred embodiment of the present invention is provided with a latch member 70 with a simple structure for latching onto a corresponding latch groove 73 on a side surface of the main body 32 as shown in FIGS. 5 and 6 to lock the folded display panel 34 onto the main body 32 without the necessity of a separated locking device.

The camera receiving body 42 has a latch member mounting room 48 formed at a position opposite to the hole 58, and a guide recess 50 formed on the upper portion of the camera receiving body 42 in order to allow the latch member 70 to be partially exposed to the exterior of the portable computer. A partition 52, having a guide hole 54, is mounted between the latch member mounting room 48 and the camera receiving room 46, thus allowing the latch member 70 to be effectively supported in the mounting room 48.

The latch member 70 includes a latch body 72 and a latch hook 74 formed on the front wall of the latch body 72 in order to engage with a latch groove 73 formed on the side surface of the main body 32 as shown in FIG. 5. A guide protrusion 76 is formed on the bottom surface of the latch is body 72 so as to be inserted into the guide hole 54 of partition 52. A compression coil spring or an elastic member 78 is mounted between the partition 52 and the bottom surface of the latch body 72 for allowing the latch hook 74 to latch onto and release from the latch groove 73 of the main body 32.

As shown in FIGS. 5 and 6, when the portable computer 30 is not used, the display panel 34 is primarily folded to the main body 32 of the portable computer 30. Thereafter, the camera mounting mechanism 40, which is mounted on the top surface of the display panel 34, is used to lock the display panel 34 onto the main body 32. At this time, the latch hook 74 of the latch member 70 is engaged with the latch groove 73 of the main body 32, thus effectively preventing the display panel 34 from being released from the main body 32.

When the portable computer 30 is used, a pushing portion 71, formed on the top portion of the latch body 72 and exposed to the exterior of the camera mounting mechanism 40, is pushed through the guide recess 50 of the camera receiving body 42 by a user. Thus, the latch hook 74 of the latch member 70 is released from the latch groove 73 of the main body 32, thereby allowing the display panel 34 to be easily opened.

Figure 7:
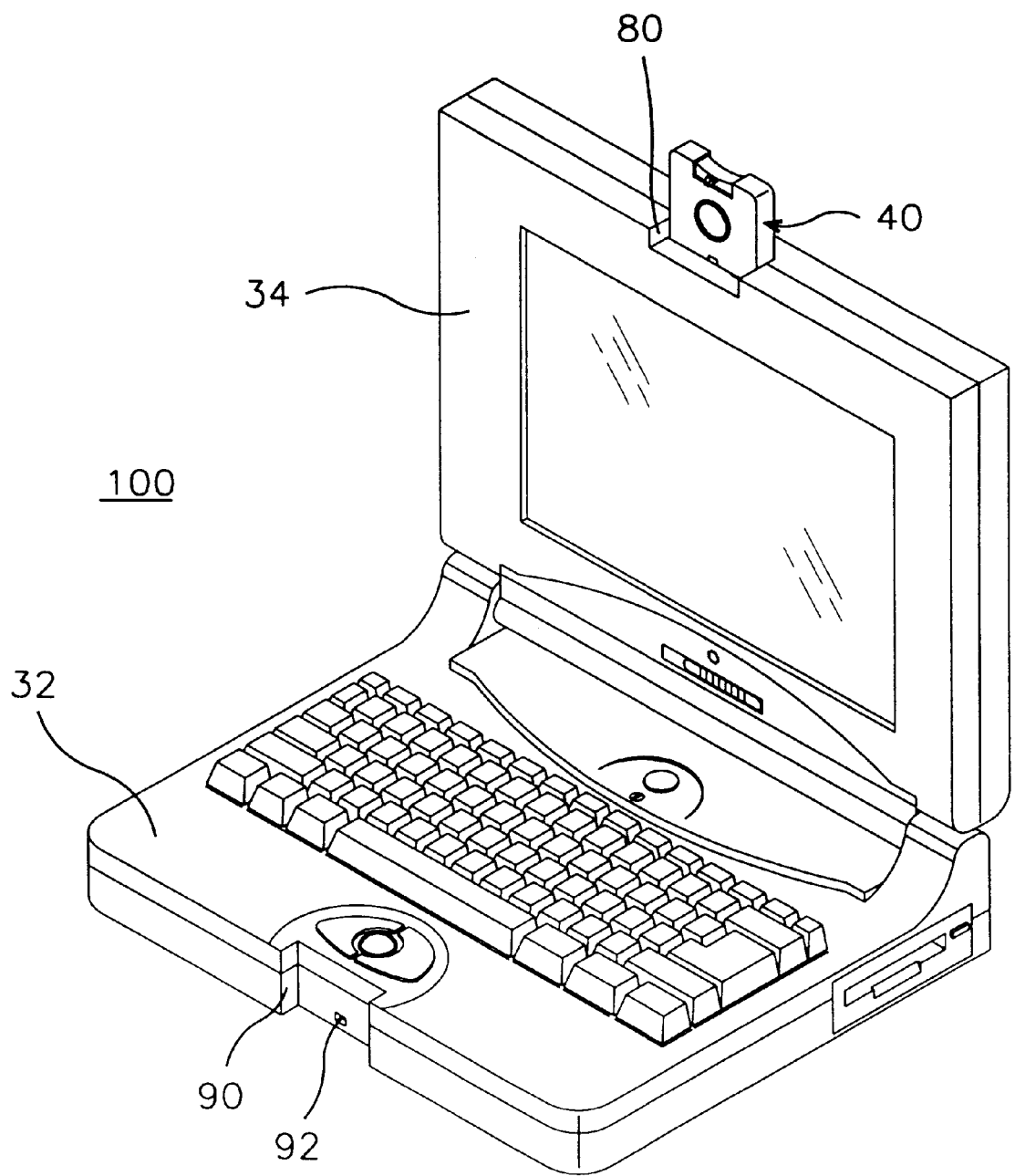
FIG. 7 is a perspective view of a portable computer with a camera mounting mechanism constructed according to a second embodiment of the present invention.
Figure 8:
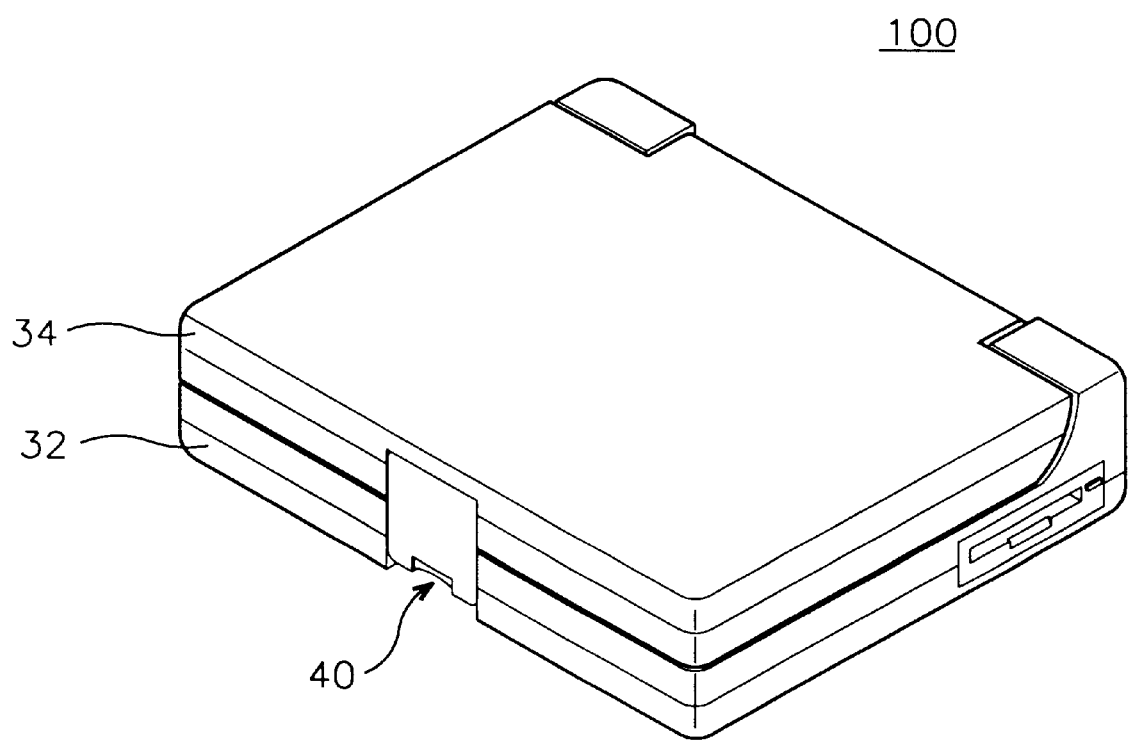
FIG. 8 is a perspective view of the portable computer of FIG. 7, when a display panel is folded and a camera mounting mechanism is latched onto a main body of the portable computer.

FIGS. 7 to 11 illustrate a portable computer with a camera mounting mechanism constructed in accordance with a second embodiment of the present invention. As shown in FIG. 7, the portable computer 100 hss a main body 32, a display panel 34 hinged to one edge of the main body 32 and a camera mounting mechanism 40 hinged to the display panel 34 in order to mount a camera to the portable computer. Thus, when the display panel 34 is folded onto the main body 32 of the portable computer in a closed position, the top portion of the camera mounting mechanism 40 is pivotable about a hinge axis to latch onto a latch groove 92 of the main body 32 for locking the display panel 34 in the closed position.

The construction of the camera mounting mechanism 40 according to the second embodiment of this invention is identical to the camera mounting mechanism 40 according to the first embodiment. However, the display panel 34 and the main body 32 of the portable computer are configured to contain corresponding seats 80 and 90. A first seat 80, having a stair shape, is formed on the top surface of the display panel 34 in order to allow the camera receiving body 42 to be hinged therein. A second seat 90, having a stair shape, is formed on the side surface of the main body 32 in order to accommodate the folding of the camera receiving body 42 hinged at the display panel 34. The first and second seats 80 and 90 share the same height and depth. This way the camera mounting mechanism 40 is easily folded to the display panel 34 and the main body 32, while improving the external appearance of the portable computer 100 and effectively preventing the camera mounting mechanism 40 from being carelessly damaged.

Figure 9:
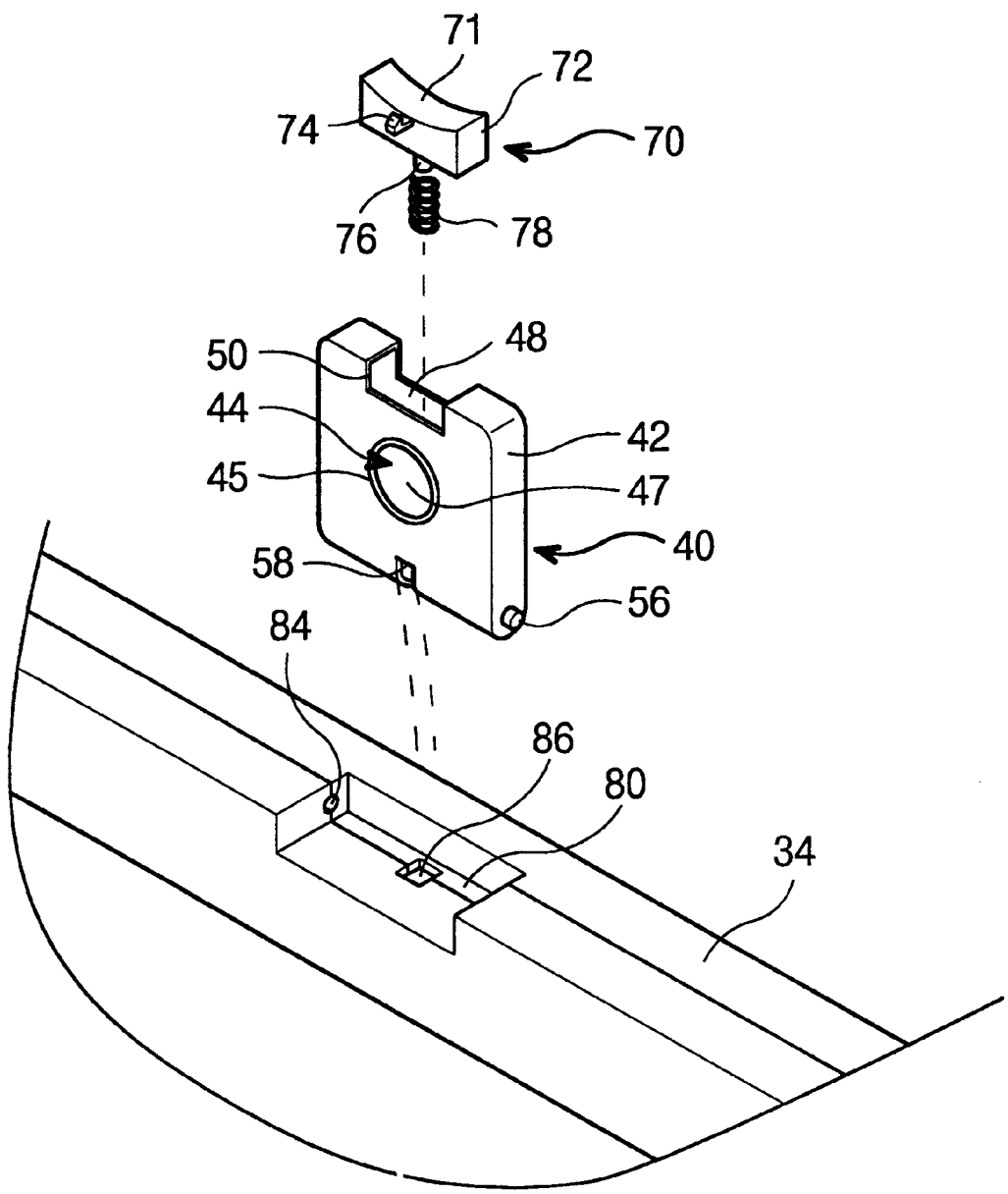
FIG. 9 is an exploded perspective view of the camera mounting mechanism of FIG. 7.

In the second embodiment, the camera receiving body 42 has two hinge pins 56 in order to individually fit into the hinge holes 84 as shown in FIG. 9. The hinge holes 84 are formed on opposite side walls of the first seat 80, respectively. Thus, the latch member 70 is easily folded in the first and second seat 80 and 90 in such a manner that the latch hook 74 of the latch member 70 is engaged with a latch groove 92 formed on the main body 32 as shown in FIG. 10.

Figure 10:
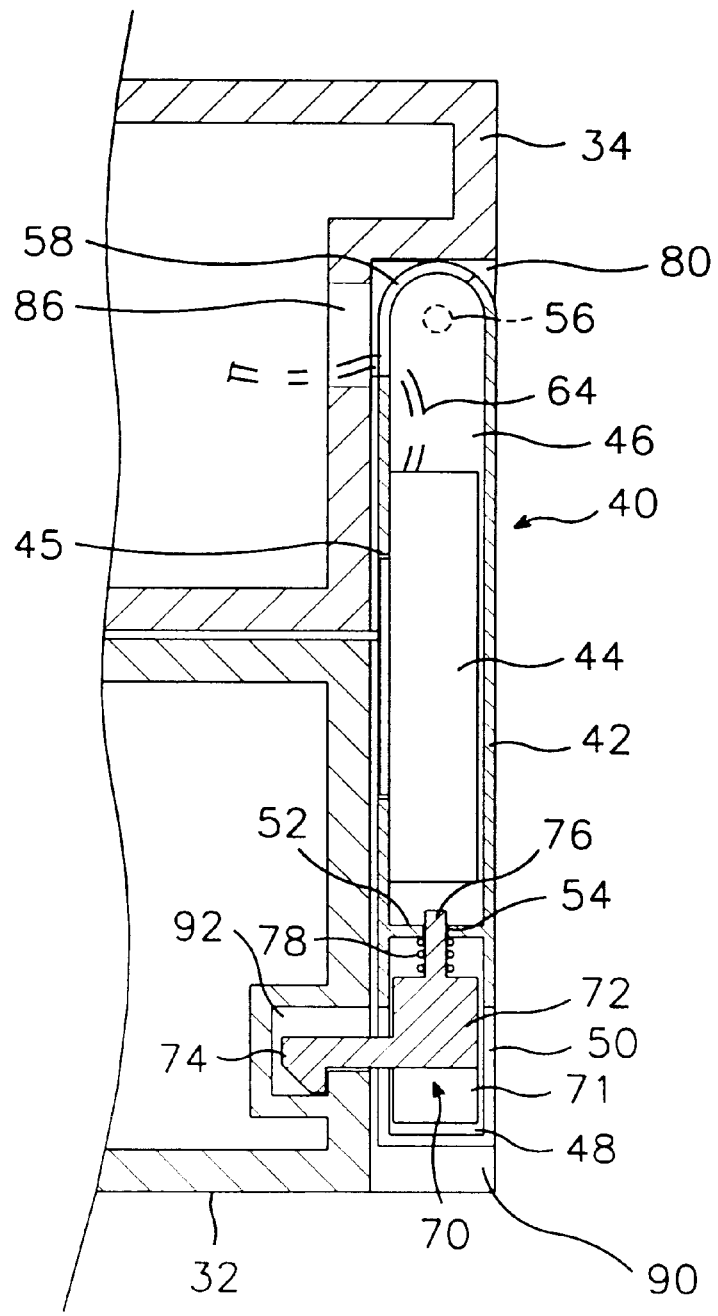
FIG. 10 is a sectional side view of the camera mounting mechanism of FIG. 8, when latched onto the main body of the portable computer.

In addition, the camera 44 in the receiving room 46 is electrically connected to the electronic circuit of a main board (not shown) in the main body 32 by the cable lines 64 as shown in FIG. 10. In order to connect the cable line 64 to the main body 32 of the portable computer, one hole 86 is formed on the bottom surface of the first seat 80, while another hole 58 is formed on the hinge portion of the camera receiving body 42 at a position corresponding to the hole 86. Thus, the camera 44 is electrically connected to the main board by the lines 64 passing through the two holes 58 and 86.

Figure 11:
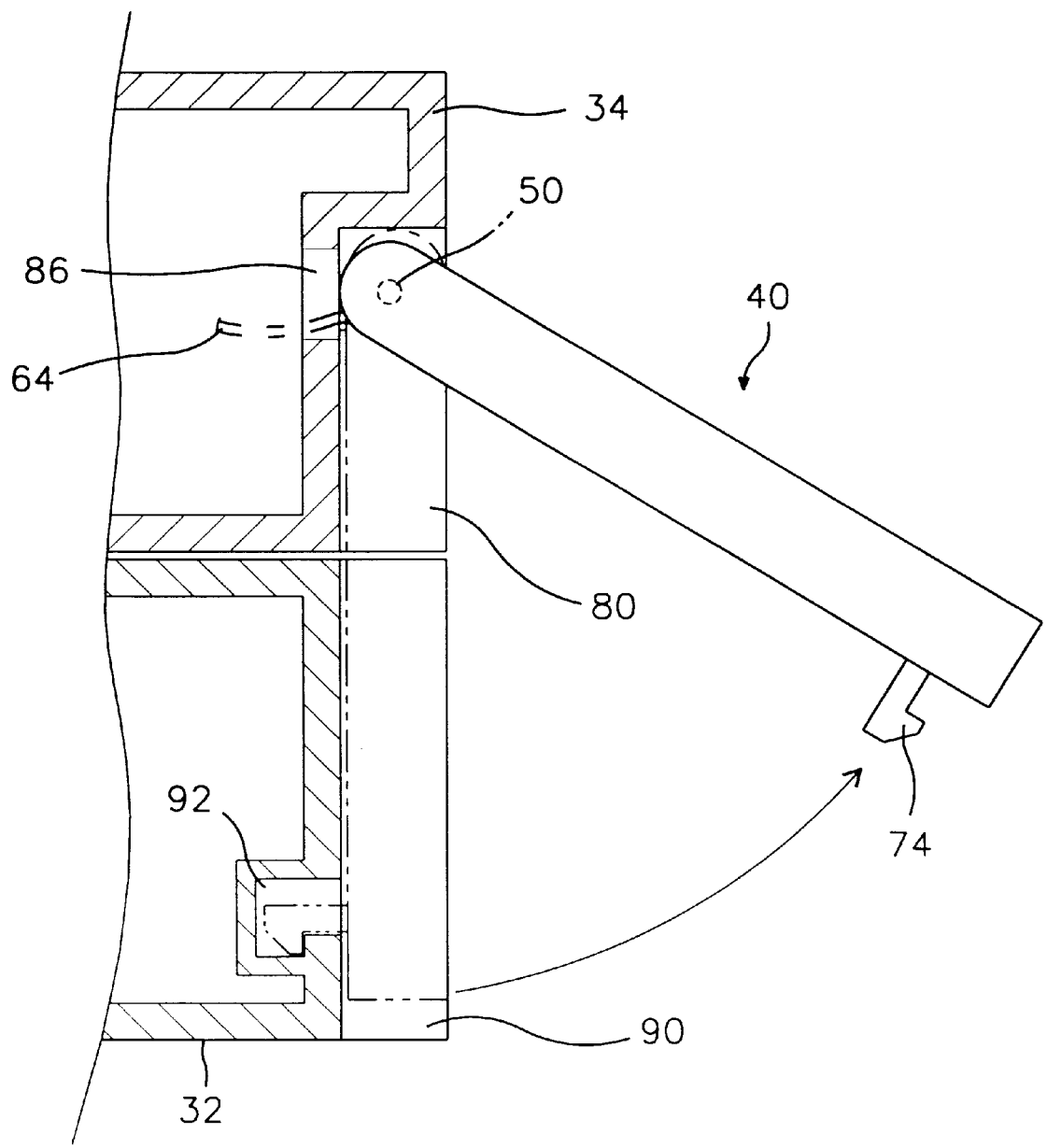
FIG. 11 is a sectional side view of the camera mounting mechanism of FIG. 8, when released from the main body of the portable computer.

As shown in FIGS. 10 and 11, when the portable computer 30 is not used, the display panel 34 is primarily folded to the main body 32 of the computer 30. Thereafter, the mounting mechanism 40 is folded to the display panel 34 and the main body 32. At this time, the latch hook 74 of the mounting mechanism 40 is engaged with the latch groove 92 of the main body 32, thus effectively preventing the display panel 34 from being released from the main body 32.

Also, when the portable computer 30 is used, the pushing portion 71, formed on the top portion of the latch body 72 and exposed to the exterior of the mounting mechanism 40, is pushed through the recess 50 of the camera receiving body 42 by a user. Thus, the latch hook 74 of the latch member 70 is released from the latch groove 92, thereby allowing the display panel 34 to be easily opened.

As described above, the camera mounting mechanism of the invention has a configuration capable of easily mounting an electronic camera to a portable computer without the necessity of a separate mounting space and mounting parts. In addition, a locking device is easily incorporated into the camera mounting mechanism for preventing the display panel from being released from the main body of a portable computer. Therefore, a portable computer, if provided with the camera mounting mechanism, is compact and light weight, and effectively maximizes usable space defined in the portable computer.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A camera mounting mechanism for mounting an electronic camera onto a display unit of a computer system, comprising:
   a camera receiving body adapted to be pivoted on a top surface the display unit of the computer system, supporting the electronic camera operatively connected to internal circuitry of the computer system;
   a camera receiving room defined in said camera receiving body having a lens of the electronic camera exposed to the exterior of the computer system through an aperture formed on a front side of said camera receiving body at a desired position; and
   a latch mechanism mounted onto said camera receiving body accommodating fastening of said front side of said camera receiving body with a front side of a main body of the computer system placing the computer system in a closed position where the display unit is parallel with the main body, the main body having an input device on a top side and pivotally hinged with a bottom surface of the display unit, the front side of the main body being perpendicular to the top side of the main body.

2. The mechanism of claim 1, further comprised of said camera receiving body having a cable recess for supporting a cable line electrically connecting the electronic camera to the internal circuitry of the computer system.

3. The mechanism of claim 1, wherein:
   both sides of a bottom portion of said camera receiving body being pivotally hinged to the first side of the display unit; and
   said latch mechanism mounted on to a top side of said camera receiving body.

4. The mechanism of claim 1, further comprised of said latch mechanism comprising:
   a latch body adjustably positioned on the camera receiving body accommodating a direct contact with a user allowing a movement of said latch body within said camera receiving body;
   a latch hook formed on a front wall of said latch body for hooking onto a latch groove of the computer system, said front wall on a same side as said front side of said camera receiving body;
   a guide protrusion formed on a bottom surface of said latch body for insertion into a guide hole of a partition; and
   an elastic member mounted between said partition and said guide protrusion of the latch body, for permitting said latch hook to be elastically engaged with and released from said latch groove of the computer system.

5. The mechanism of claim 4, wherein a top portion of said camera receiving body having a recess exposing a top portion of said latch body, a length of said latch body being greater than a length of the recess preventing said latch body from escaping said camera receiving body.

6. The mechanism of claim 4, further comprising:
   two protrusions on a bottom portion of said camera receiving body, each one of said protrusions being on opposite sides of said camera receiving body; and
   two hinge portions mounted on the display unit with each one of said hinge portions having a hole accommodating each one said protrusions allowing said camera receiving body to pivot with the display unit.

7. The mechanism of claim 4, further comprising:
   two protrusions on a bottom portion of said camera receiving body, each one of said protrusions being on opposite sides of said camera receiving body;
   a first seat having a step shape formed on the display unit with both sides of said seat having a hole accommodating each one of said protrusions allowing said camera receiving body to pivot with the display unit; and
   a second seat having a step shape formed on the main body and accommodating said latched hook of said camera receiving body.

8. The mechanism of claim 7, wherein said camera receiving body being flush with the display unit and the main body when said camera receiving body is latched to the main body placing the computer in a closed position.

9. A computer system, comprising:
a base panel having on a front side a latch groove of a predetermined width a top side of said base panel accommodating an input device, said front side of said base panel being perpendicular to said top side of said base panel;
a display panel pivotally mounted on said base panel for movement between a closed position when said display panel pivots to cover said base panel, and an open position when said display panel pivots to open said base panel; and
a camera mounting mechanism having a pair of hinge protrusions on opposite sides pivotally mounted on a top surface of said display panel, accommodating an electronic camera having an aperture accommodating a lens of the electronic camera on a front side of said camera mounting mechanism operatively connected to internal circuitry of said base panel via said display panel, and locking said display panel when said display panel is folded onto said base panel in the closed position, said camera mounting mechanism comprising a main body having a latch member mounting room accommodating flexibly supporting a latch member accommodating latching the front side of said camera mounting mechanism onto the latch groove of said front side of said base panel to lock said display panel while said display panel is in the closed position.

10. The computer system of claim 9, further comprised of said latch member comprising:
a latch body adjustably positioned in said latch member mounting room accommodating a direct contact with a user allowing a movement of said latch body within said camera receiving body;
a latch hook formed on a front wall of said latch body for hooking onto the latch groove of said base panel, said front wall on a same side as said front side of said camera receiving body;
a guide protrusion formed on a bottom surface of said latch body for insertion into a guide hole of a partition; and
an elastic member mounted between said partition and said guide protrusion of the latch body, for permitting said latch hook to be elastically engaged with and released from said latch groove of the base panel.

11. The computer system of claim 9, further comprised of said display panel having said hinge protrusions provided on the top surface permitting said camera mounting mechanism with the latch hook on said front side of said camera mounting mechanism to pivot between a release position when the latch hook is released from the latch groove of said front side of said base panel and a latch position when the latch hook is hooked to the latch groove of said base panel.

12. The computer system of claim 9, further comprised of said display panel having a slot between the hinge protrusions provided on the top surface permitting an electric cable to connect the electronic camera to the internal circuitry of said base panel.

13. A computer system, comprising:
a base panel having a first seat in a stair shape accommodating a camera mounting mechanism and a latch groove of a predetermined width formed at a bottom of the first seat;
a display panel pivotally mounted on said base panel accommodating movement between a closed position when the display panel pivots to cover said base panel, and an open position when said display panel pivots to open said base panel, said display panel having a second seat in a stair shape on a top surface accommodating said camera mounting mechanism; and
said camera mounting mechanism pivotally mounted on opposite walls of the second seat of said display panel, supporting an electronic camera on a front side operatively connected to internal circuitry of said base panel via said display panel, and said camera mounting mechanism locking said display panel when said display panel is folded onto said base panel in the closed position, said camera mounting mechanism comprising a main body having a latch member mounting room flexibly supporting a latch member accommodating latching onto the latch groove of said base panel to lock said display panel while said display panel is in the closed position, said camera mounting mechanism having a flat back side opposite the front side and being flush with said display panel and said base panel when in the closed position.

14. The computer system of claim 13, further comprised of said latch member comprising:
a latch body adjustably positioned in said latch member mounting room accommodating a direct contact with a user allowing a movement of said latch body within said camera mounting mechanism;
a latch hook formed on a front wall of said latch body for hooking onto the latch groove of said base panel, said front wall being on same side as said front side of said camera mounting mechanism;
a guide protrusion formed on a bottom surface of said latch body for insertion into a guide hole of a partition; and
an elastic member mounted between said partition and said guide protrusion of said latch body, for permitting said latch hook to be elastically engaged with and released from the latch groove of said base panel.

15. The computer system of claim 14, further comprised of said second seat of said display panel having a slot provided on the top surface for permitting an electric cable to connect electronic camera to the internal circuitry of said base panel.

16. A method, comprising the steps of:
pivotally attaching a back side of a display unit with a back side of a main body of a portable computer, said display unit having a front surface providing variable video display, said main body accommodating an input device and electrical components controlling said portable computer;
forming a pair of first holes on a top side of said display unit;
forming a slot between the pair of first holes;
forming a camera receiving body with a width not greater than the distance between the first holes of said display unit;
installing a camera within the housing of said camera receiving body;
forming an aperture on a front side of said camera receiving body accommodating a lens of said camera;
forming a first slot on a bottom side of said camera receiving body;
attaching a cable from said camera through the first slot and into the first hole of said display unit electrically connecting said camera with the electrical components of said portable computer;
forming two hinge pins on opposite sides of said camera receiving body and being perpendicular to a field of view of said camera;

attaching each one of said two hinge pins to each one said first holes allowing said camera receiving body to be pivotally attached to said display unit;

forming an opening on a top side of said camera receiving body;

forming a partition in an internal space of said camera receiving body creating a barrier between said camera installed in said camera receiving body and the opening formed on a top side of said camera receiving body;

installing a latch body inside of said camera receiving body in a region between said partition and said top side of said camera receiving body, a top side of said latch body being exposed through the opening in said camera receiving body accommodating a user to push down on said latch body;

forming a latch hook on a front side of said latch body and being exposed through the opening in said camera receiving body, the front side of said latch being the same side exposing said lens of said camera;

forming a protrusion on a bottom side of said latch body;

forming a second hole on said partition accommodating said protrusion;

installing a resilient member circumscribing said protrusion and residing between said bottom side of said latch body and said partition, said resilient member providing a force opposing the downward pushing force made by the user on said top side of said latch body;

pivoting said camera receiving body perpendicular to the front surface of the display unit; and fastening said latching hook to a corresponding latch groove formed on a side surface of the main body, fastening said latching hook placing said portable computer in a closed position where said display unit is parallel with said main body.

17. The method of claim 16, further comprising the step of forming a pair of hinge protrusions on said top side of said display unit accommodating the pair of first holes that are accommodating said hinge pins of said camera receiving body, said hinge protrusions allowing said camera receiving body to rotate about said hinge pins at least 180 degrees.

18. The method of claim 16, further comprising the steps of:

forming a step shaped first seat on said top side of said display unit, two walls of said first seat on opposite sides within said first seat having each one accommodating each one of the pair of first holes, the first holes allowing the pivoting of said camera receiving body within said seat when each one of said hinge protrusions are inserted into each one the first holes; and forming a step shaped second seat on a front side of said main body accommodating said latch groove and accommodating said camera receiving body, said camera receiving body being flush with said display unit and said main body when said camera receiving body is latched to said main body, the side of camera receiving body having the aperture facing a front side of the main body when being latched, the front side of the main body being perpendicular with a ground.

19. The method of claim 18, wherein said camera receiving body forming a space between a ground surface and said latch body when said camera receiving body being latched to said main body, the space accommodating a user to release said latch by pushing upwardly said latch body.

20. The method of claim 19, wherein said camera receiving body pivoting at least 90 degrees about said hinged protrusions.

* * * * *